United States Patent
Thubert et al.

(10) Patent No.: US 8,300,626 B2
(45) Date of Patent: *Oct. 30, 2012

(54) PATH SHORTENING IN A WIRELESS MESH NETWORK

(75) Inventors: Pascal Thubert, La Colle sur Loup (FR); Patrick Wetterwald, Mouans Sartoux (FR); Vincent Jean Ribiere, Biot (FR); Billy Gayle Moon, Cary, NC (US); Johannes Petrus Kruys, Harmelen (NL)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/338,187

(22) Filed: Dec. 27, 2011

(65) Prior Publication Data

US 2012/0093037 A1 Apr. 19, 2012

Related U.S. Application Data

(63) Continuation of application No. 11/729,886, filed on Mar. 30, 2007, now Pat. No. 8,111,684.

(51) Int. Cl.
*H04L 12/28* (2006.01)

(52) U.S. Cl. ......... 370/351; 370/352; 370/406; 370/338

(58) Field of Classification Search ................ 370/338, 370/312, 390, 254, 256, 351, 406, 401, 408, 370/410, 431, 474, 352; 455/41.2, 512, 453, 455/450, 411, 509; 709/223
See application file for complete search history.

(56) References Cited

U.S. PATENT DOCUMENTS

| | | | |
|---|---|---|---|
| 6,678,241 B1 * | 1/2004 | Gai et al. ................ | 370/216 |
| 7,398,322 B1 * | 7/2008 | Perlman ................. | 709/239 |
| 7,502,354 B1 | 3/2009 | Maufer | |
| 7,522,540 B1 | 4/2009 | Maufer | |
| 7,843,834 B2 * | 11/2010 | Picard ..................... | 370/238 |
| 8,111,684 B2 | 2/2012 | Thubert et al. | |
| 2003/0026268 A1 | 2/2003 | Navas | |
| 2003/0161268 A1 * | 8/2003 | Larsson et al. .......... | 370/229 |
| 2004/0032831 A1 | 2/2004 | Matthews | |

(Continued)

OTHER PUBLICATIONS

Johnson et al., "The Dynamic Source Routing Protocol", <draft-ietf-manet-dsr-10.txt>, IETF MANET Working Group. Jul. 19, 2004, pp. i-v and 1-112 (117 pages total).

(Continued)

*Primary Examiner* — Jean Gelin
*Assistant Examiner* — Mahendra Patel
(74) *Attorney, Agent, or Firm* — Leon R. Turkevich

(57) ABSTRACT

In one embodiment, a method includes a mesh point receiving mesh advertisement messages from advertising mesh points of a wireless mesh network having a mesh portal with a wired connection to a wired network. Each mesh advertisement message specifies a corresponding metric for reaching the mesh portal and has a corresponding signal strength indicator. An ordered group of parent access points, ordered based on the respective metrics, is generated from among the advertising mesh points, starting with a first parent access point having a corresponding optimum metric for reaching the mesh portal and independent of the corresponding signal strength indicator. A registration message is sent to each of the parent access points identifying a corresponding specified priority based on a corresponding position in the ordered group, for use by the corresponding parent access point in selecting a minimum interframe spacing for forwarding a wireless packet received from the mesh point.

17 Claims, 5 Drawing Sheets

U.S. PATENT DOCUMENTS

| | | | |
|---|---|---|---|
| 2004/0103275 A1* | 5/2004 | Ji et al. | 713/150 |
| 2005/0163144 A1 | 7/2005 | Srikrishna et al. | |
| 2005/0192037 A1 | 9/2005 | Nanda et al. | |
| 2005/0213531 A1* | 9/2005 | Nanda | 370/328 |
| 2006/0056368 A1 | 3/2006 | Ratiu et al. | |
| 2006/0056456 A1 | 3/2006 | Ratiu et al. | |
| 2006/0109801 A1* | 5/2006 | Ashwood Smith | 370/256 |
| 2006/0245373 A1 | 11/2006 | Bajic | |
| 2006/0251419 A1 | 11/2006 | Zadikian et al. | |
| 2006/0262737 A1 | 11/2006 | Livet et al. | |
| 2006/0291404 A1 | 12/2006 | Thubert et al. | |
| 2007/0086361 A1* | 4/2007 | Allan et al. | 370/254 |
| 2007/0153764 A1 | 7/2007 | Thubert et al. | |
| 2008/0043638 A1 | 2/2008 | Ribiere et al. | |
| 2008/0112363 A1 | 5/2008 | Rahman et al. | |
| 2008/0130491 A1* | 6/2008 | Chao et al. | 370/225 |
| 2008/0181133 A1 | 7/2008 | Thubert et al. | |
| 2009/0146839 A1* | 6/2009 | Reddy et al. | 340/870.02 |

OTHER PUBLICATIONS

Perkins et al., "Ad hoc On-Demand Distance Vector (AODV) Routing", Network Working Group, Request for Comments: 3561, Jul. 2003, pp. 1-37.

Clausen, et al., "Optimized Link State Routing Protocol (OLSR)", Network Working Group, Request for Comments: 3626, Oct. 2003, pp. 1-75.

Koenig, "Wireless Mesh Design & Deployment", *Cisco Networks Solutions Forum 2007*, pp. 1-30.

* cited by examiner

| Frame Control | Duration | DA "MAP4" | SA "MAP6" | SSSID "MAP6" | Seq. Ctrl. | Priority=3 (or SIFS = SIFS3) | FCS |

Priority=3 (or SIFS = SIFS3) — 122

| Frame Control | Duration | RA "Multicast" | TA "MAP4" | DA "D1" | Seq. Ctrl. | SA "MAP6" | QoS Ctrl. | Frame Body | FCS |

140 — RA "Multicast"
142 — TA "MAP4"
144 — DA "D1"
146 — SA "MAP6"

PATH SHORTENING IN A WIRELESS MESH NETWORK

This application is a continuation of copending application Ser. No. 11/729,886, filed Mar. 30, 2007.

TECHNICAL FIELD

The present disclosure generally relates to deploying a wireless local area network (WLAN) using wireless link protocols, such as IEEE 802.11e and IEEE P802.11s/D.100 wireless Ethernet, based on implementing a mesh network having distributed mesh points in communication with a mesh portal having a wired link to a wide area network.

BACKGROUND

Wireless local area networks are being deployed in large-scale service areas using mesh networking. Mesh networking can utilize mesh points (MPs) to establish a mesh backhaul infrastructure. For example, the IEEE P802.11s/D1.00 specification describes mesh points as devices that support WLAN mesh services, i.e. they participate in the formation and operation of the mesh network. The mesh points can establish a mesh backhaul infrastructure based on establishing peer-to-peer wireless links between each mesh point, and establishing a tree topology that is "rooted" by a "mesh portal": the mesh portal is a mesh point that has a wired link for reaching a wide area network. Mesh points that also serve as "access points" for wireless client devices are referred to as "Mesh Access Points" (MAPs). The distribution of the mesh points can extend wireless coverage of the WLAN over a larger coverage area for wireless user devices.

Mesh networking utilizes routing protocols that enable mesh path selection and forwarding of data packets at the link layer. For example, the IEEE P802.11s specification defines a default mandatory routing protocol (Hybrid Wireless Mesh Protocol, or HWMP). Another example mesh network utilizes a protocol known as Adaptive Wireless Path Protocol (AWP), available for example in the commercially available Cisco Aironet 1500 Series Outdoor Mesh Access Point by Cisco Systems, San Jose, Calif.

BRIEF DESCRIPTION OF THE DRAWINGS

Reference is made to the attached drawings, wherein elements having the same reference numeral designations represent like elements throughout and wherein:

FIGS. 4A and 4B illustrates an example registration message and an example data packet according to an example embodiment.

DESCRIPTION OF EXAMPLE EMBODIMENTS

OVERVIEW

Figure 1:
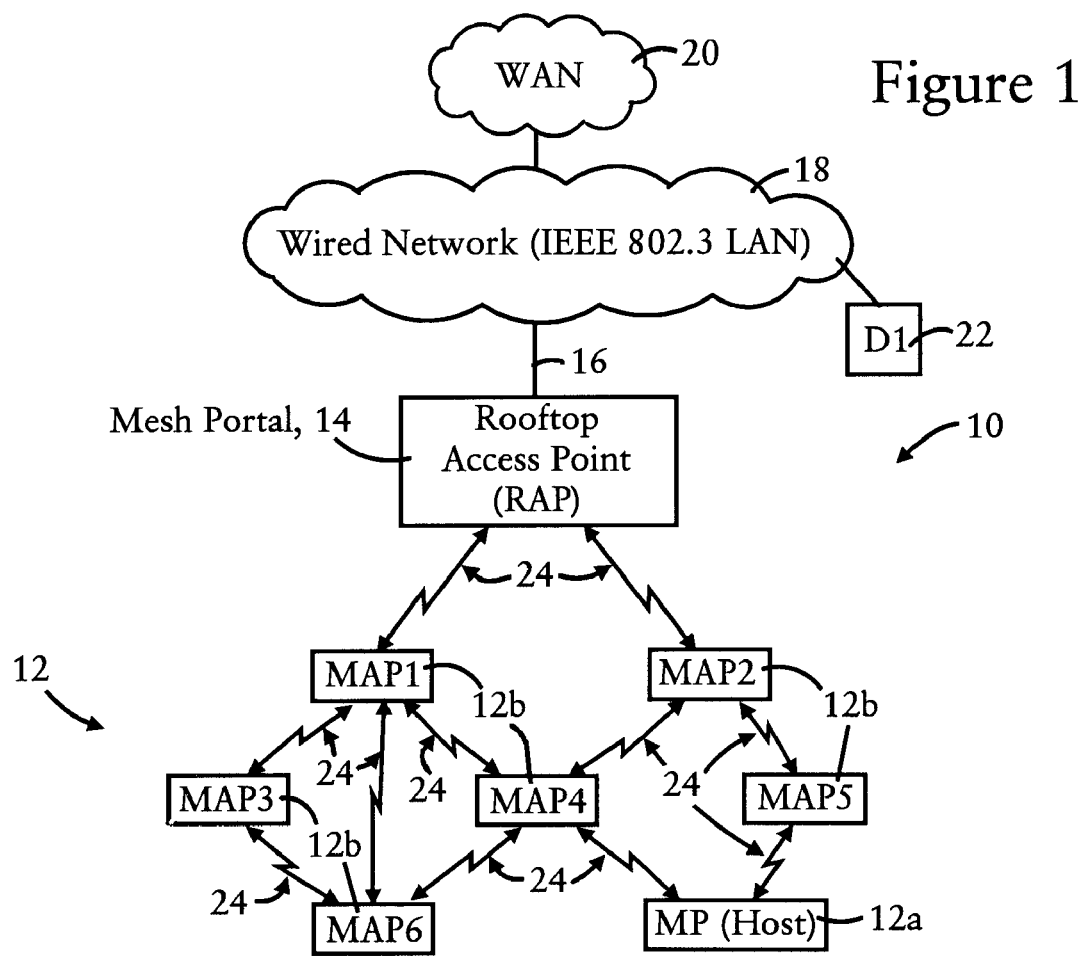
FIG. 1 illustrates an example mesh network according to an example embodiment.

In one embodiment, a method comprises receiving, by a mesh point, mesh advertisement messages from respective advertising mesh points of a wireless mesh network having a mesh portal, the mesh portal having a wired connection to a wired network. Each mesh advertisement message specifies a corresponding metric for reaching the mesh portal and has a corresponding signal strength indicator. The method also includes generating from among the advertising mesh points an ordered group of parent access points ordered based on the respective metrics, the ordered group starting with a first parent access point having a corresponding optimum metric for reaching the mesh portal and independent of the corresponding signal strength indicator. The method also includes sending to each of the parent access points a registration message identifying a corresponding specified priority based on a corresponding position in the ordered group, for use by the corresponding parent access point in selecting a minimum interframe spacing for forwarding a wireless packet received from the mesh point.

In another embodiment, an apparatus comprises a wireless mesh interface circuit and a parent selection circuit. The wireless mesh interface circuit is configured for receiving mesh advertisement messages from respective advertising mesh points of a wireless mesh network having a mesh portal, the mesh portal having a wired connection to a wired network. Each mesh advertisement message specifies a corresponding metric for reaching the mesh portal and has a corresponding signal strength indicator. The parent selection circuit is configured for generating from among the advertising mesh points an ordered group of parent access points ordered based on the respective metrics, the ordered group starting with a first parent access point having a corresponding optimum metric for reaching the mesh portal and independent of the corresponding signal strength indicator. The parent selection circuit further is configured for generating, for output via the wireless mesh interface circuit to each of the parent access points, a corresponding registration message identifying a corresponding specified priority based on a corresponding position in the ordered group, for use by the corresponding parent access point in selecting a minimum interframe spacing for forwarding a wireless packet received from the apparatus.

DETAILED DESCRIPTION

Particular embodiments disclosed herein enable mesh points (e.g., mesh access points) within a mesh network to automatically implement a directed acyclic graph having multiple paths toward a mesh portal having a wired connection, without the necessity of any network device (e.g., any mesh point, any mesh controller, etc.) calculating the directed acyclic graph for reaching the mesh portal. In particular, a mesh point that joins the mesh network can select, from among a number of advertising mesh points indicating reachability to the mesh portal, an ordered group of parent access points based on link layer attributes, described below. Since each mesh point is configured to wait a prescribed minimum interframe spacing before attempting transmission on a wireless link, the mesh point assigns to each of its parent access points a corresponding priority that causes the corresponding parent access point to select the corresponding minimum interframe spacing that can be used before forwarding a wireless packet received from the mesh point. The mesh point sends a registration message to each of its parent access points specifying the corresponding spacing value to be used in forwarding any wireless packet received from the mesh point.

Hence, each of the parent access points are assigned a corresponding priority in forwarding any wireless packet received from the mesh point, based on the corresponding position of the parent access point within the ordered group. Consequently, if any parent access point receives a wireless packet from the mesh point, the parent access point will use the selected minimum interframe spacing, based on the priority assigned by the mesh point having transmitted the wireless packet. Consequently, if a parent access point receives a wireless packet from the mesh point, the parent access point determines whether the wireless link is inactive for the selected minimum interframe spacing (identified by the corresponding assigned priority) following completed transmission of the transmitted packet: if the wireless link becomes active before completion of the selected minimum interframe spacing, indicating that another parent access point has a higher priority, the parent access point having a lower priority drops the transmitted packet; however, if the wireless link remains inactive for the selected minimum interframe spacing following completed transmission of the transmitted packet, the parent access point initiates broadcasting the transmitted packet to its parent access points, for transmission toward the mesh portal. Hence, the use of different minimum interframe spacing values by respective parent access points enables the parent access points to automatically implement a priority-based access protocol for a given mesh point.

Further, the ordered group of parent access points can be ordered based on link attributes, including the respective metrics for reaching the mesh portal having a wired connection to a wired network. In other words, assuming a number of parent access points are available to forward a packet toward a mesh portal having a wired connection to a wired network, and assuming that all of the parent access points in fact receive a wireless packet transmitted by a mesh point, then it is desirable that the parent access point having the optimum metric for reaching the mesh portal should forward the received packet, even though that parent access point had the lowest probability of receiving the packet initially from the mesh point. For example, a given advertising mesh point of the wireless mesh network may have an optimum metric (e.g., minimum cost) for reaching a mesh portal, but may have a relatively unreliable wireless link with a mesh point; regardless of the relatively unreliable wireless link with the mesh point, if the advertising mesh point having the optimum metric for reaching the mesh portal is able to successfully receive a wireless packet from the transmitting mesh point, then the advertising mesh point with the optimum metric should be given priority to forward the received wireless packet to the mesh portal at the least cost, relative to other mesh points that have a more reliable wireless link with the mesh point but which have a higher cost for reaching the mesh portal.

Consequently, the highest-priority parent access point can be identified as the one having the optimum metric for reaching the mesh portal, even though the highest-priority parent access point may have a lesser probability of the receiving a packet from the mesh point.

In addition, the successive ordering of parent access points for each mesh point that joins the wireless mesh network enables the automatic implementation of a directed acyclic graph for reaching the mesh portal, based on each mesh point having its own corresponding ordered group of parent access points, and based on automatic implementation of a priority-based access protocol where each of the parent access points within the ordered group has a distinct minimum interframe spacing.

Figure 2:
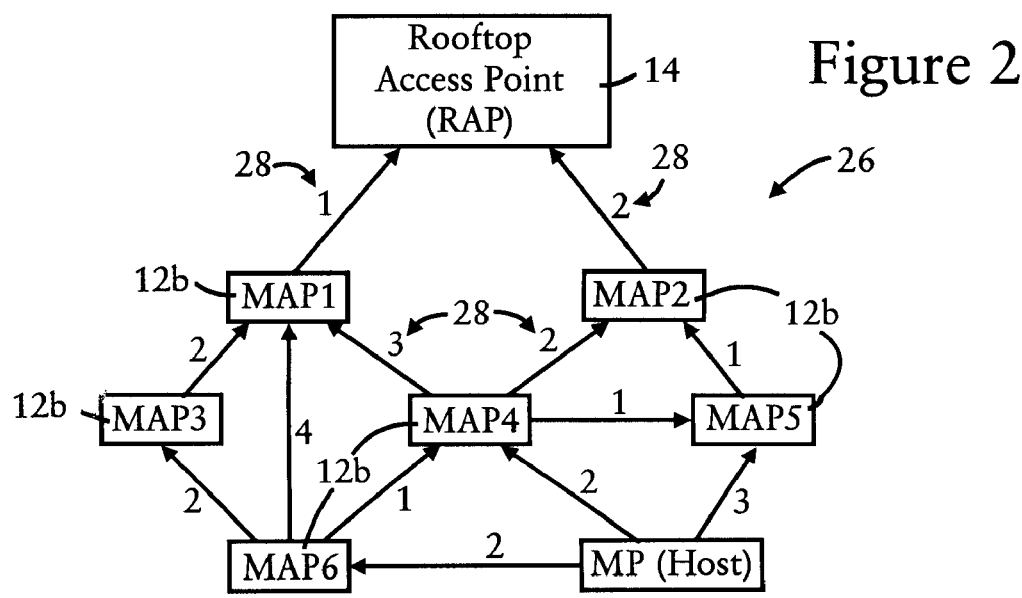
FIG. 2 illustrates an example directed acyclic graph implemented by the mesh points in the system illustrated in FIG. 1.

FIG. 1 illustrates an example wireless mesh network 10 having multiple mesh points 12, (e.g., wireless host devices 12a and mesh access points (MAPs) 12b) that automatically implement a directed acyclic graph, illustrated in FIG. 2, for reaching a mesh portal 14, according to an example embodiment. The mesh portal 14, also referred to as a "rooftop access point" (RAP), can be implemented as a wired mesh access point having a wired connection 16 to a wired local area network (e.g., an IEEE 802.3 LAN) 18, serving as a root for wireless mesh points 12 that do not have a wired connection. The mesh portal 14 also may provide a wired connection to a wide area network (WAN) 20 and/or a wired host device 22 via the LAN 18.

Each of the mesh points 12 (e.g., the host MP 12a and the MAPs 12b) can communicate with the mesh portal 14 via wireless mesh links 24 established between the mesh points 12 and the mesh portal 14. Each mesh access point (MAP) 12b can be implemented for example based on the commercially-available Cisco Aironet Series 1500 Mesh Access Point from Cisco Systems, San Jose, Calif., and applying the features described below. Although not illustrated in FIG. 1, each MAP 12b can be controlled by a mesh controller within the wired LAN 18 according to a prescribed lightweight access point protocol, for example a Lightweight Access Point Protocol (LWAPP) as described in the Internet Engineering Task Force (IETF) Request for Comments (RFC) 4565.

The wireless mesh network also can be implemented according to existing wireless protocols as promulgated by the Institute for Electrical and Electronic Engineers (IEEE), including IEEE 802.11, IEEE 802.11e and the proposed P802.11s/D1.00. In particular, the wireless nodes 12 can be implemented using a well-known physical layer (layer 1) and link layer (layer 2) protocol according to the Open Systems Interconnection (OSI) Reference Model: an example protocol is the IEEE 802.11 Specification, which was published by the Institute of Electrical and Electronics Engineers (IEEE) as "IEEE 802.11, Wireless LAN Medium Access Control (MAC) and Physical Layer (PHY) specifications," Standard, IEEE, New York, N.Y., August 1999.

The IEEE also published numerous supplements to the IEEE 802.11 specification, for example the IEEE 802.11a specification, the IEEE 802.11b specification, and the IEEE 802.11e specification, published Nov. 11, 2005 as "IEEE Std 802.11e-2005, IEEE Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications—Amendment 8: Medium Access Control (MAC) Quality of Service (QoS) Enhancements" (ISBN 0-7381-4772-9) (referred to herein as "the IEEE 802.11e specification").

The IEEE also published a proposed standard referred to as IEEE 802.11s and/or IEEE 802.11s/D1.00, published November 2006 as "IEEE P802.11s™/D1.00 Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking".

The IEEE 802.11e specification specifies transmitting packets using a Carrier Sense Multiple Access with Collision Avoidance (CSMA/CA) mechanism. For example, a first station that has a packet to transmit determines if the wireless transmission medium is in use, i.e., if any data is currently being transmitted on the wireless transmission medium. If the medium is in use by a second station, the first station defers its transmission until detecting that the wireless medium is quiescent (i.e., is not currently transmitting any data; inactive) for at least a prescribed time interval. The first station can begin transmitting its data packet on the wireless transmission medium only after the medium has been quiescent for at least the prescribed time interval. The "prescribed time interval" for waiting to transmit after the wireless medium became quiescent can vary: the IEEE 802.11e specification describes five different interframe space (IFS) parameters to provide priority levels for access to the wireless medium, namely the short interframe space (SIFS), the PCF interframe space (PIFS), the Distributed Coordinated Function (DCF) interframe space (DIFS), the arbitration interframe space (AIFS), and the extended interframe space (EIFS). The IEEE 802.11e specification describes the SIFS as having the minimum interframe space relative to the PIFS, DIFS, AIFS, and EIFS.

The IEEE 802.11e specification also describes an enhanced distributed channel access (EDCA) that delivers traffic based on differentiating user priorities (UPs), where differentiation is achieved by varying various parameters for different UP values, including the amount of time that a wireless network node must wait for the wireless channel to be idle before the wireless network node can attempt transmission or initiate "backoff" procedures with other wireless network nodes contending for access to the wireless channel.

According to the example embodiments described herein, each mesh point (e.g., MAP4) 12b can choose an ordered group of parent access points (e.g., MAP1, MAP2, MAP5) based on received mesh advertisement messages from the respective advertising mesh points (e.g., MAP1, MAP2, MAP5), based on respective metrics specified in the mesh advertisement messages and that identify an associated cost (or ease) in reaching the mesh portal. As illustrated in FIG. 2, the directed acyclic graph (DAG) 26 illustrates for each link a corresponding link cost 28: each link cost 28 is illustrated as a single number for simplicity, although it will be appreciated that the actual link cost may be implemented using various methodologies, including received signal strength indicator (RSSI), received channel power indicator (RCPI) as described in the IEEE 802.11k. The IEEE P802.11s specification also describes an airtime link metric computation procedure that reflects the amount of channel resources consumed by transmitting the frame over a particular link, measured in terms of bit rate and frame error rate for a given test frame size.

Each mesh point 12, in response to receiving an advertisement message, can determine the aggregate metric in reaching the mesh portal 14. For example, the mesh access points MAP1 and MAP2 can determine the cost for reaching the mesh portal 14 based on the direct link cost, for example the RSSI, the RCPI, or the airtime cost according to IEEE P802.11s; using the illustrated metrics 28 of FIG. 2, the "first hop" mesh access points MAP1 and MAP2 can advertise the corresponding metric for reaching the mesh portal 14 as "1" and "2", respectively. Similarly, if the mesh access point MAP5 advertises reachability to the mesh portal 14, it can advertise the aggregate cost as "3" based on adding the link cost "1" between MAP5 and MAP2 with the advertised cost "2" by the mesh access point MAP2. Hence, the mesh access point MAP4 can measure the link cost 28 between the advertising mesh access points MAP1, MAP2, and MAP5, and can add the measured link costs 28 with the advertised metrics for reaching the mesh portal 14 to calculate that aggregate cost for reaching mesh portal 14 is the same, namely the aggregate cost of "4" via any of the mesh access points MAP1, MAP2, and MAP 5.

Conventional wireless mesh network protocols may suggest that a wireless node (e.g., MAP4) should choose its parent based on identifying the advertising parent having the strongest signal strength, since the statistical probability of a node receiving a packet is reduced in direct proportion to signal strength; in this case, the MAP 4 would tend to choose MAP5 as its parent, even though when compared to the other advertising mesh points MAP1 and MAP2, the MAP5 is the furthest number of hops away from the mesh portal 14, and therefore may encounter the greatest latency.

Other wireless mesh network protocols utilize a statistical aggregation based on determining the aggregate cost as described above, where the aggregate cost of reaching the mesh portal 14 is "4" regardless of whether the mesh point MAP4 chooses to forward the packet via the mesh access point MAP1, MAP2, or MAP5. Such wireless mesh network protocols that rely on statistical aggregation fail to recognize that the statistical properties of wireless transmission do not directly correlate to actual transmission results, because a given parent may in fact receive a wireless packet from its attached mesh point, despite the reduced probability of the reception being successful. In other words, if a packet transmitted by the mesh point MAP4 is received by all the mesh points MAP1, MAP2, MAP5, then the best cost for reaching the mesh portal 14 is now via the mesh point MAP1 which has the lowest relative cost of "1" despite the reduced probability of receiving the packet from the mesh point MAP4 due to the higher link cost ("3") between the attached mesh point MAP4 and the parent mesh point MAP1. However, existing tree based topologies within a wireless mesh network preclude multiple parents from repeating a packet due to concerns of collisions and wasted bandwidth. Hence, prior wireless mesh network protocols have created situations where the mesh access point MAP1 is not permitted to forward a packet received from the mesh access point MAP4 to the mesh portal 14, even though the mesh access point MAP1 as the best metric for reaching the mesh portal 14.

According to the example embodiments, each mesh access point (e.g., MAP4) can choose an ordered group of parent mesh access points (e.g., MAP1, MAP2, MAP5) based on the respective metrics advertised by the respective parent mesh access points for reaching the mesh portal. Further, each mesh access point (e.g., MAP4) can assign to each of the parent access points (e.g., MAP1, MAP2, MAP5) a corresponding access priority based on the corresponding position of the parent access point within the ordered group; hence, if each of the parent access points receive a wireless packet broadcast by the mesh point, the parent access point (e.g., MAP1) having the highest assigned access priority can begin retransmitting the received wireless packet before the other parent access points (e.g., MAP2 and MAP5) are authorized to attempt retransmission. Hence, the highest priority parent access point can transmit the packet via its optimum path toward the mesh portal 14, while the other parent access points (e.g., MAP2 and MAP5), in response to detecting activity on the wireless link 24 during their required deferral interval, can consider the retransmission by the highest priority parent access point as an acknowledgment of the transmitted packet and therefore drop the packet.

Hence, the example embodiments enable the path to a mesh portal 14 to be substantially reduced in the event that a parent access point having the optimum metric relative to the mesh portal is able to receive the wireless packet.

Figure 3:
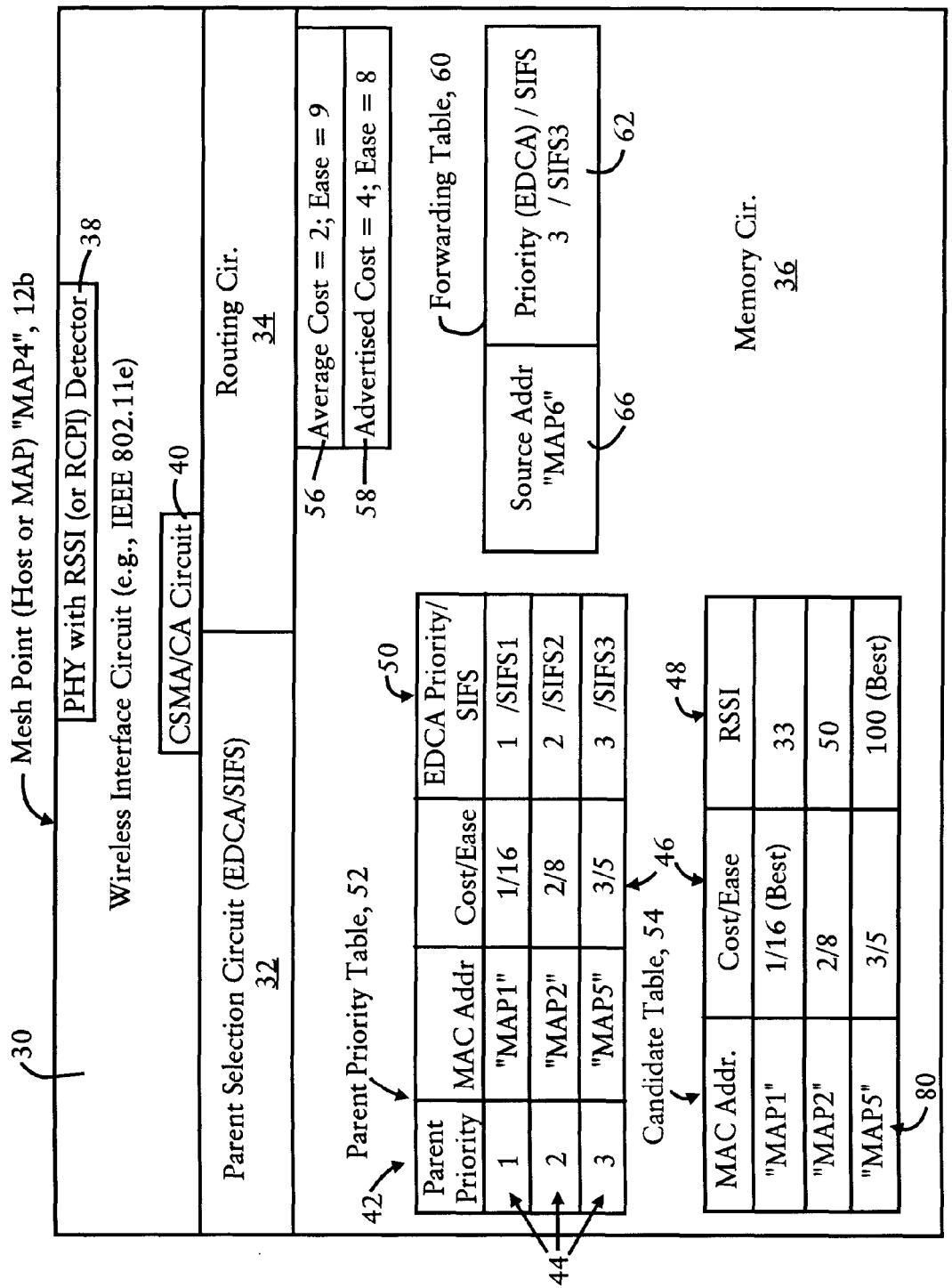
FIG. 3 illustrates an example mesh access point in the system illustrated in FIG. 1.

FIG. 3 is a diagram illustrating an example mesh point according to an example embodiment. The mesh point, for example "MAP4", includes a wireless mesh interface circuit 30, a parent selection circuit 32, a routing circuit 34, and a memory circuit 36.

The wireless interface circuit 30, implemented for example according to the IEEE 802.11, IEEE 802.11e, and IEEE P802.11s, can include a physical layer (PHY) transceiver circuit 38 and a Carrier Sense with Multiple Access and Collision Avoidance (CSMA/CA) circuit 40. The physical layer transceiver circuit 38 can be configured for detecting the received signal strength of a received data packet on a wireless link 24, and outputting for the wireless interface circuit 30 a corresponding received signal strength indicator (RSSI); alternately, the physical layer transceiver circuit 38 also can detect and report a received channel power indicator (RCPI) value. The CSMA/CA circuit 40 can be configured for waiting a prescribed minimum interframe spacing before attempting access to a wireless medium 24: as described below, the prescribed minimum interframe spacing can be supplied by the routing circuit 34 in response to detecting the source of a received wireless data packet.

The parent selection circuit 32 is configured for generating within the memory circuit 36 an ordered group 42 of parent access points 44: as described in further detail below, the ordered group 42 of parent access points 44 is ordered based on the respective metrics 46 for reaching the mesh portal 14 as advertised by the parent mesh access points, and based on the signal strength indicator 48 determined by the physical layer transceiver 38 (as used herein, the "signal strength indicator" 48 can be implemented either using the RSSI value or the RCPI value). The parent selection circuit 32 also is configured for assigning, to each parent access point 44, a corresponding specified priority 50 to be used by the corresponding parent access point 44 in selecting a minimum interframe spacing for forwarding a wireless packet that is received from the mesh point MAP4.

The memory circuit 36 includes a parent priority table 52 for storing the ordered group 42 of parent access points 44, a candidate table 54, an average cost register 56, and the advertised cost register 58, and a forwarding table 60.

The routing circuit 34 is configured for calculating a revised metric 58 for reaching the mesh portal 14 by the corresponding mesh access point ("MAP4"), and outputting onto the wireless link 24 an advertisement message specifying that the corresponding mesh access point ("MAP4") can reach the mesh portal 14 at the cost specified by the revised metric 58. The routing circuit 34 also is configured for storing priority information 62 for an attached mesh point 66 in the forwarding table, and selecting the priority information 62 as a selected minimum interframe spacing to be used by the wireless interface circuit 32 each time a wireless packet is received from the attached mesh point 66.

Any of the disclosed circuits of the mesh access point 12 (including the wireless network interface circuit 30, the parent selection circuit 32, the routing circuit 34, and their associated components) can be implemented in multiple forms, including hardware logic that is implemented in a logic array such as a programmable logic array (PLA), a field programmable gate array (FPGA), or by mask programming of integrated circuits such as an application-specific integrated circuit (ASIC); any of these circuits also can be implemented using a software-based executable resource that is executed by a corresponding internal processor such as a microprocessor (not shown), where execution of executable code stored in internal nonvolatile memory (e.g., within the memory circuit 36) causes the processor to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 36 can be implemented as a non-volatile memory, for example an EPROM, a DRAM, etc.

Further, any reference to "outputting a message" or "outputting a packet" can be implemented based on creating the message/packet in the form of a data structure and storing that data structure in a tangible memory medium in the disclosed apparatus (e.g., in a transmit buffer), and electrically transmitting (e.g., via wireless electric field, as appropriate) the message/packet stored in the tangible memory medium to another network node via a communications medium (e.g., a wireless link, as appropriate) (optical transmission also can be used, as appropriate). Similarly, any reference to "receiving a message" or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

Figure 5A:
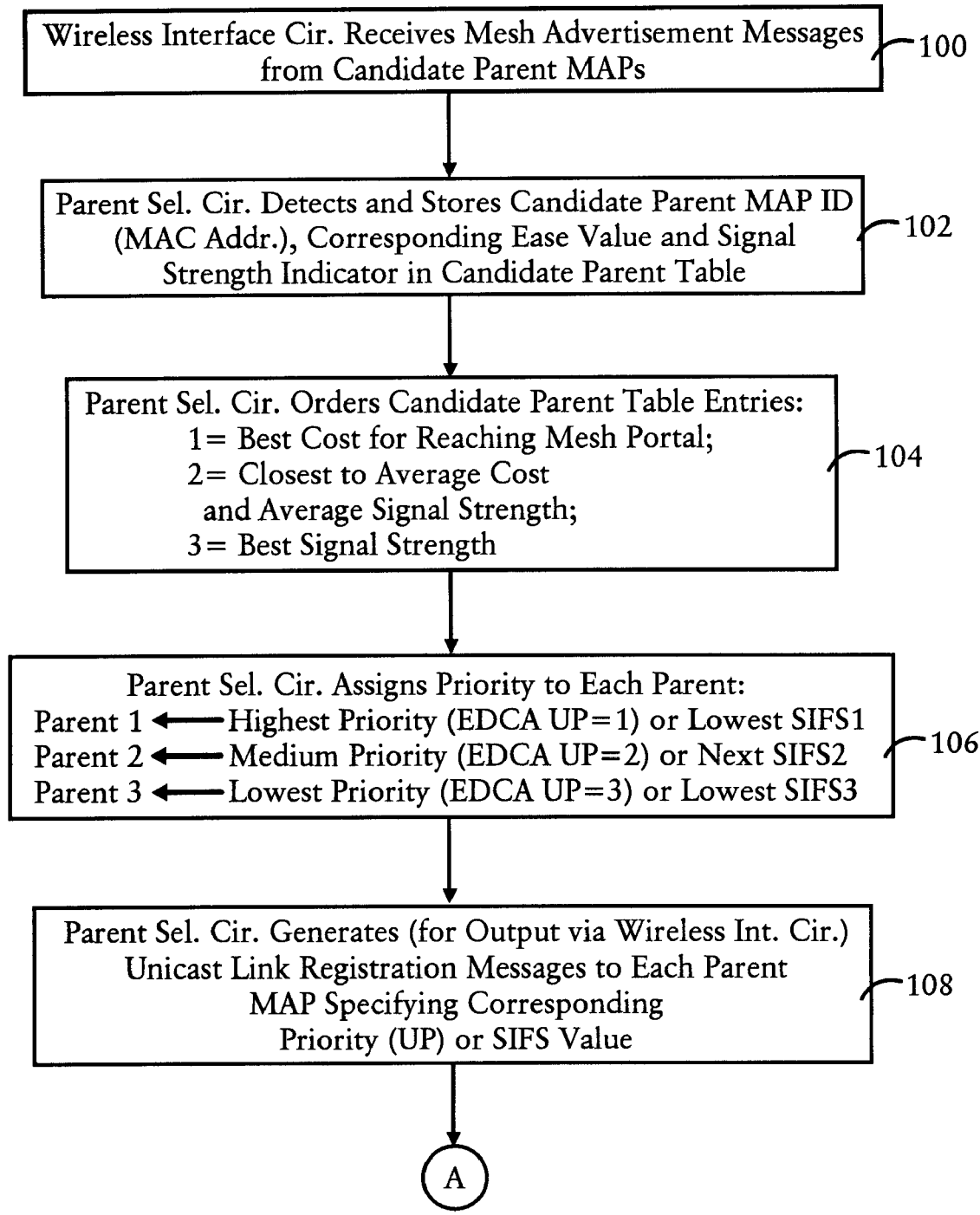
FIGS. 5A and 5B illustrate an example method by the mesh access points illustrated in FIGS. 2 and 3.
Figure 5B:
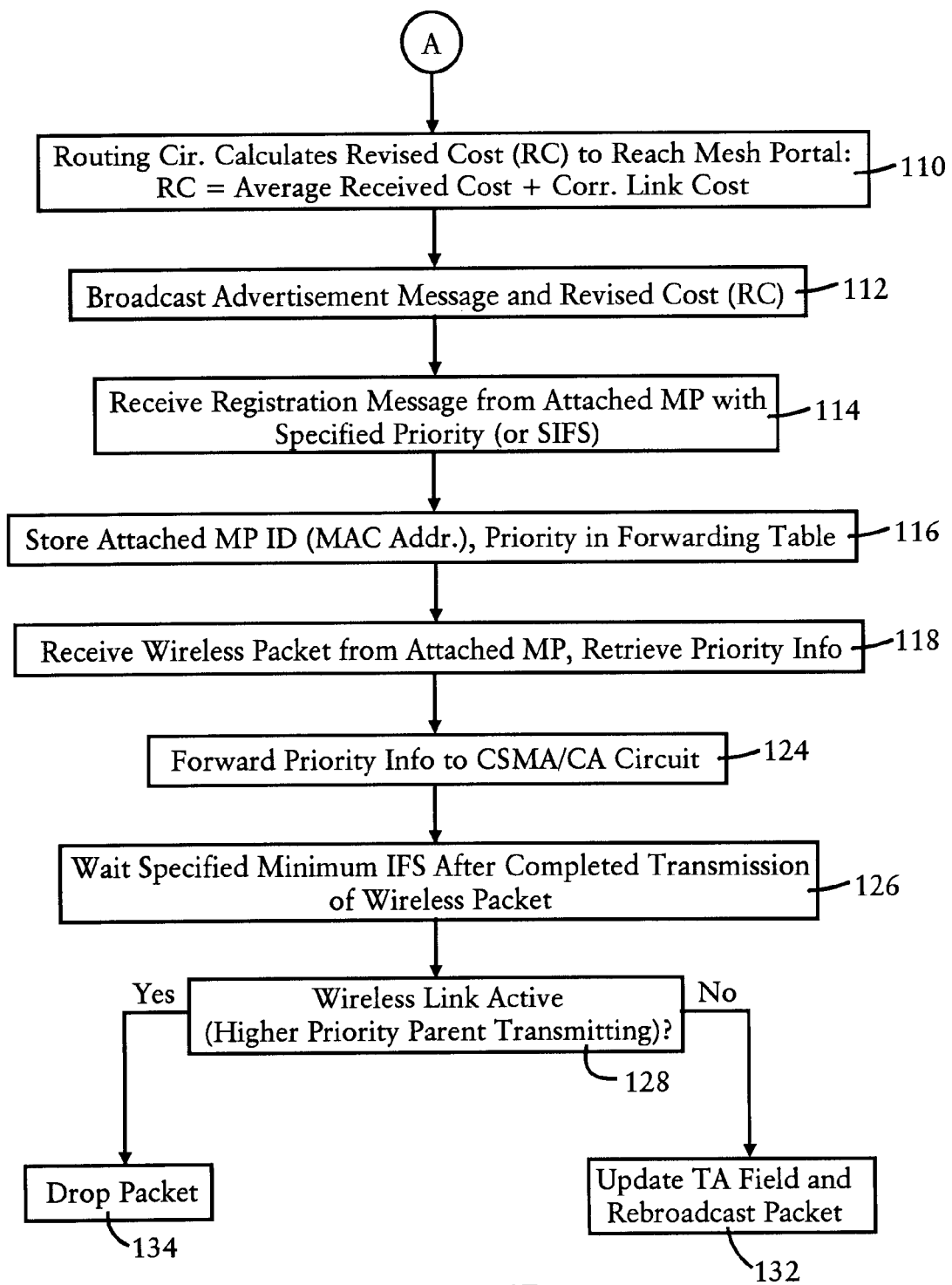

FIGS. 5A and 5B illustrates an example method by the mesh point "MAP4" of choosing an ordered group of parent access points, and selecting a minimum interframe spacing for use in forwarding a received wireless packet from an attached mesh point, according to an example embodiment. The steps described with reference to FIGS. 5A and 5B can be implemented as executable code stored on a computer readable medium (e.g., floppy disk, hard disk, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

The wireless interface circuit 30 receives in step 100 multiple mesh advertisement messages from candidate parents mesh access points. The parent selection circuit 32 stores in step 102 the MAC address 80, the corresponding advertised metric 46, and the corresponding signal strength 48 as detected by the physical layer transceiver 38 for each corresponding received mesh advertisement message in the candidate table 54. As illustrated in FIG. 3, the advertised metric 46 may be expressed as either a cost for reaching the mesh portal 14, or alternately may be expressed as the relative "ease" in reaching the mesh portal. An example of using "ease" as the advertised metric 46 (i.e., the inverse of "cost") can be found in the Adaptive Wireless Path (AWP) Protocol in the commercially available Cisco Aironet 1500 Series Outdoor Mesh Access Point by Cisco Systems, San Jose, Calif. As illustrated in FIG. 3, the corresponding value for "ease" is the modulo-16 integer inverse of the cost value, and the signal strength value indicates the percent signal strength, where "100" is the best signal strength possible. The advertised metric 46 also can be implemented using the airtime link metric described in IEEE P802.11s/D1.00 (see, for example, section 11A.4).

As illustrated in FIG. 3, storage of the candidate parents in the candidate table 54 indicates that the mesh access point ""MAP5" has the best signal strength, however the mesh access point "MAP1" advertises the best cost (maximum ease) in reaching the mesh portal 14. The parent selection circuit 32 orders in step 104 the candidate parent table entries into the parent priority table 52 based on the metric values 46 and the signal strength values 48. In particular, the parent selection circuit 32 chooses the first parent access point having the top priority "1" based solely on the first parent access point having the best cost 46 for reaching the mesh portal, and therefore independent of the corresponding signal strength indicator 48. In other words, even though there is a relatively low probability that the mesh access point "MAP1" will actually receive any packet transmitted by the mesh access point "MAP4", the mesh access point "MAP1" is given highest priority because if the mesh access point "MAP1" does receive the wireless packet transmitted by the mesh access point "MAP4", it will have the optimum metric 46 for reaching the mesh portal 14.

The parent selection circuit 32 chooses the second parent access point having the second priority "2" based on correlating the corresponding metric 46 relative to the average of the received metrics 46, and based on correlating the corresponding signal strength indicator 48 relative to the average of the received signal strength indicators. Hence, since the average cost 46 among the candidate parents in the candidate table 54 is "2" (i.e., (1+2+3)/3) (or an average "ease" of (16+8+5)/3=9) and the average signal strength is "61" (i.e., (33+50+100)/3), the mesh access point "MAP2" has the closest cost value 46 and signal strength 48 relative to the average cost and average signal strength. The choice of the second parent access point represents a preferred choice for a unique parent in a tree-based topology.

The parent selection circuit 32 chooses the third parent access point based on the corresponding signal strength indicator 48 having a maximum value relative to the other received signal strength indicators. The third parent access point represents the best probability that the packet will be received by another network node.

After ordering the parent access points in the parent priority table 52, the parent selection circuit 32 assigns in step 106 the corresponding access priority to each parent. For example, the specified priority 50 can be expressed in terms of User Priority (UP) according to the enhanced distributed channel access protocol, or alternately as an explicit short interframe spacing (SIFS) value, where the value "SIFS1" corresponds to the absolute minimum SIFS value that is permitted, and the respective values "SIFS2" and SIFS3" represents successively larger SIFS values, such that SIFS1<SIFS2<SIFS3<DIFS.

After assigning the specified priority using either EDCA or SIFS, the parent selection circuit 32 generates and outputs via the wireless interface circuit 30 in step 108 unicast registration messages 120, described below with respect to FIG. 4A. Hence, each of the parent access points "MAP1", "MAP2", and "MAP5", in response to receiving the corresponding unicast registration message 120, stores the MAC address of the mesh access point "MAP4" in the corresponding specified priority in its forwarding table, for use in selecting a minimum interframe spacing for forwarding any wireless packet received from the mesh point "MAP4". The parent selection circuit 32 also stores the average cost (and/or average ease) from among the parent access points in the average cost register 56.

Referring to FIG. 5B, the routing circuit 34 calculates in step 110 a revised cost (RC) to reach the mesh portal 14 based on retrieving the average cost from the register 56, and adding the corresponding link cost from the most likely parent in a tree structure (e.g., parent "MAP2" having priority "2") as specified in the candidate table 54; as used herein, "adding" in step 110 also can encompass aggregating or combining the average ease factor ("9") stored in the register 56 with the ease factor ("8") for the most likely parent ("MAP2") according to a prescribed aggregation function, resulting in a revised ease value (e.g., "8"). The routing circuit 34 stores the revised cost (and/or ease value) in the register 58 as the advertised cost, and the wireless interface circuit 30 broadcasts in step 112 a mesh advertisement message generated by the routing circuit 34 and that specifies the revised cost 58, namely that the mesh portal 14 is reachable by the mesh access point "MAP4" at a cost of "4" (or ease of "8").

Assuming that the mesh access point "MAP6" of FIG. 1 received the mesh advertisement message from the mesh access point "MAP4", the mesh access point "MAP6" could select the mesh access point "MAP1" as its first parent access point, the mesh access point "MAP3" as its second parent access point, and the mesh access point "MAP4" as the third access point using similar selection procedures described above. Similarly, the mesh access point "MAP6" sends the registration message 120, illustrated in FIG. 4A, to the MAP4, specifying a priority value 122 that the mesh access point "MAP4" has a user priority level of "3" according to EDCA protocol, or alternately that the spacing value to be used is "SIFS3".

Hence, the wireless interface circuit 30 of the mesh access point "MAP4" receives in step 114 the registration message 120 from the attached mesh point "MAP6" in the routing circuit 34 stores in step 116 the MAC address 66 of the attached mesh point, and the corresponding assigned priority value 62. Upon storage of the MAC address 66 in the corresponding assigned priority 62 for the attached mesh point in the forwarding table 60, the routing circuit 34 can begin performing forwarding operations on behalf of the attached mesh point.

Assuming in step 118 that the wireless interface circuit 30 of the mesh point "MAP4" receives a data frame broadcast by the mesh point "MAP6", the routing circuit 34 retrieves in step 118 the corresponding priority information 62 from the forwarding table 60 based on the source address of the received wireless packet matching the MAC address 66 stored in the forwarding table 60. The routing circuit 34 forwards the priority information 62 to the CSMA/CA circuit 40 in step 124. The CSMA/CA circuit 40 loads the received priority information 62 for execution according to the prescribed priority-based access protocol.

In particular, the CSMA/CA circuit 40 waits in step 126 the specified minimum interframe spacing (IFS) according to the priority information 62 following the completed transmission of the wireless packet from the attached mesh access point "MAP6". If in step 128 the wireless link 24 is inactive for the selected minimum interframe spacing (according to the priority information 62) following completed transmission of the wireless packet, indicating none of the higher priority mesh access points received the data packet, the CSMA/CA circuit 40 initiates broadcasting of the transmitted packet as a retransmitted packet 130 in step 132, illustrated in FIG. 4B. In particular, the retransmitted packet includes a receiver address (RA) field 140 specifying a multicast address, a transmitting address (TA) field 142 specifying the MAC address of the transmitting mesh access point "MAP4", a destination address (DA) field 144 specifying the MAC address of the final destination of the data packet, and a source address (SA) field 146 specifying the MAC address of the originating mesh point "MAP6".

As illustrated in FIG. 5B, however, if in step 128 the CSMA/CA circuit 40 detects activity on the wireless link 24, indicating that a higher-priority parent already is transmitting the data packet, then the wireless interface circuit 30 drops the packet in step 134. In other words, if EDCA is used in the CSMA/CA circuit 40 for the priority-based access, the detection of transmission by the higher-priority parent is considered an implicit acknowledgment of reception of the data packet in step 118 by the higher-priority parent, enabling the CSMA/CA circuit 40 to drop the packet based on the implicit acknowledgment; if the modified SIFS values are used for the priority-based access, the detection of the transmission by the higher-priority parent is considered a representation of an explicit acknowledgment of the reception of the data packet in step 118 by the higher-priority parent, enabling the CSMA/CA circuit 40 to drop the packet based on the representation of the explicit acknowledgement.

According to the example embodiments, a directed acyclic graph can automatically be implemented based on generating an ordered group of parent access points, and assigning to each of the parent access point a corresponding access priority for selecting a minimum interframe spacing for forwarding a wireless packet. Hence, path optimization can automatically be implemented based on whether a given mesh access point actually receives a data packet. Further, other mesh access points having a lower priority can drop their packet in response to detecting activity on the wireless link within their respective minimum interframe spacing, eliminating the potential for collisions within the wireless mesh network 10.

It should also be noted that the operations of generating an ordered group of parent access points, and sending the respective registration messages, could be implemented by a controller within the wired network 18 (e.g., according to LWAPP), in order to reduce complexity in the mesh points 12, for example in the case of the mesh point host 12*a*.

What is claimed is:

1. A method comprising:
    receiving, by a mesh point, mesh advertisement messages from respective advertising mesh points of a wireless mesh network having a mesh portal, the mesh portal having a wired connection to a wired network, each mesh advertisement message specifying a corresponding metric for the corresponding advertising mesh point reaching the mesh portal and having a corresponding signal strength indicator;
    generating by the mesh point from among the advertising mesh points an ordered group of parent access points each providing a corresponding mesh link for reachability for the mesh point to the mesh portal, the ordered group ordered based on the respective metrics specified in the respective mesh advertisement messages, the ordered group starting with a first parent access point chosen by the mesh point based on the first parent access point having a corresponding optimum metric for reaching the mesh portal and chosen independent of the corresponding signal strength indicator, and
    sending by the mesh point to each of the parent access points a corresponding registration message identifying a corresponding specified priority based on a corresponding position in the ordered group, for use by the corresponding parent access point in selecting a corresponding distinct minimum interframe spacing for forwarding toward the mesh portal a wireless packet received from the mesh point via the corresponding mesh link.

2. The method of claim 1, wherein the corresponding priority value of the corresponding first parent access point corresponds to a minimum spacing value for the minimum interframe spacing relative to the other parent access points, each successive parent access point following the first parent access point having a successively longer spacing value for the minimum interframe spacing.

3. The method of claim 1, wherein the sending includes one of specifying the specified priority according to one of an enhanced distributed channel access (EDCA) according to IEEE 802.11e protocol, or specifying the specified priority as a corresponding Short Interframe Spacing (SIFS) value to be used as the minimum interframe spacing according to IEEE 802.11 protocol.

4. The method of claim 1, wherein each received metric is expressed as a corresponding cost to reach the mesh portal, the optimum metric identified as having a minimum cost to reach the mesh portal relative to the other received metrics.

5. The method of claim 1, wherein each received metric is expressed as a corresponding ease in reaching the mesh portal, the optimum metric identified as having a highest ease in reaching the mesh portal relative to the other received metrics.

6. The method of claim 1, further comprising:
    calculating a revised metric for the mesh point reaching the mesh portal, and
    outputting by the mesh point an advertisement message specifying the mesh point can reach the mesh portal according to the revised metric.

7. The method of claim 6, further comprising:
    receiving a second registration message from an attached mesh point and that identifies a corresponding specified priority to be used by the mesh point in selecting the minimum interframe spacing in forwarding a transmitted packet having been transmitted by the attached mesh point;
    receiving the transmitted packet from the attached mesh point via a wireless link;
    if the wireless link is inactive for the selected minimum interframe spacing following completed transmission of the transmitted packet, initiating broadcasting the transmitted packet to the parent access points upon the wireless link having been inactive for the selected minimum interframe spacing;
    if the wireless link becomes active following completed transmission of the transmitted packet and before completion of the selected minimum interframe spacing, dropping the transmitted packet.

8. The method of claim 6, wherein the calculating includes:
    identifying the average metric from among the parent access points; and
    determining the revised metric based on adding to the average metric a corresponding link cost for reaching the corresponding parent access point having the average metric.

9. An apparatus comprising:
    a wireless mesh interface circuit configured for receiving mesh advertisement messages from respective advertising mesh points of a wireless mesh network having a mesh portal, the mesh portal having a wired connection to a wired network, each mesh advertisement message specifying a corresponding metric for the corresponding advertising mesh point reaching the mesh portal and having a corresponding signal strength indicator; and
    a parent selection circuit configured for generating, in the apparatus, from among the advertising mesh points an ordered group of parent access points each providing a corresponding mesh link for reachability for the apparatus to the mesh portal, the ordered group ordered based on the respective metrics specified in the respective mesh advertisement messages, the ordered group starting with a first parent access point chosen by the parent selection circuit based on the first parent access point having a corresponding optimum metric for reaching the mesh portal and chosen independent of the corresponding signal strength indicator;
    the parent selection circuit further configured for generating, for output via the wireless mesh interface circuit to each of the parent access points, a corresponding registration message identifying a corresponding specified priority based on a corresponding position in the ordered group, for use by the corresponding parent access point in selecting a corresponding distinct minimum interframe spacing for forwarding toward the mesh portal a wireless packet received from the apparatus via the corresponding mesh link.

10. The apparatus of claim 9, wherein the corresponding priority value of the corresponding first parent access point corresponds to a minimum spacing value for the minimum interframe spacing relative to the other parent access points, each successive parent access point following the first parent access point having a successively longer spacing value for the minimum interframe spacing.

11. The apparatus of claim 9, wherein the parent selection circuit is configured for specifying the specified priority according to one of an enhanced distributed channel access (EDCA) according to IEEE 802.11e protocol, or specifying the specified priority as a corresponding Short Interframe Spacing (SIFS) value according to IEEE 802.11 protocol.

12. The apparatus of claim 9, wherein each received metric is expressed as a corresponding cost to reach the mesh portal, the optimum metric identified as having the minimum cost to reach the mesh portal relative to the other received metrics.

13. The apparatus of claim 9, wherein each received metric is expressed as a corresponding ease in reaching the mesh portal, the optimum metric identified as having a highest ease in reaching the mesh portal relative to the other received metrics.

14. The apparatus of claim 9, further comprising a routing circuit configured for calculating a revised metric for the apparatus reaching the mesh portal, and generating, for output by the wireless mesh interface circuit, an advertisement message specifying the apparatus can reach the mesh portal according to the revised metric.

15. The apparatus of claim 14, further comprising a memory circuit, wherein:
the wireless mesh interface circuit is configured for receiving a second registration message from an attached mesh point and that identifies a corresponding specified priority to be used by the apparatus in selecting the minimum interframe spacing in forwarding a transmitted packet having been transmitted by the attached mesh point;
the routing circuit configured for storing an address of the attached mesh point and the corresponding specified priority in the memory circuit;
the wireless mesh interface circuit is configured for responding to reception of the transmitted packet from the attached mesh point, via a wireless link, by initiating broadcasting the transmitted packet to the parent access points if the wireless link has been inactive for selected minimum interframe spacing following completed transmission of the transmitted packet, else dropping the transmitted packet if the wireless link becomes active following completed transmission of the transmitted packet and before completion of the selected minimum interframe spacing.

16. The apparatus of claim 14, wherein routing circuit is configured for:
identifying the average metric from among the parent access points; and
determining the revised metric based on adding to the average metric a corresponding link cost for reaching the corresponding parent access point having the average metric.

17. An apparatus comprising:
means for receiving mesh advertisement messages from respective advertising mesh points of a wireless mesh network having a mesh portal, the mesh portal having a wired connection to a wired network, each mesh advertisement message specifying a corresponding metric for the corresponding advertising mesh point reaching the mesh portal and having a corresponding signal strength indicator; and
means for generating, in the apparatus, from among the advertising mesh points an ordered group of parent access points each providing a corresponding mesh link for reachability for the apparatus to the mesh portal, the ordered group ordered based on the respective metrics specified in the respective mesh advertisement messages, the ordered group starting with a first parent access point chosen by the means for generating based on the first parent access point having a corresponding optimum metric for reaching the mesh portal and chosen independent of the corresponding signal strength indicator;
the means for generating further configured for generating, for output to each of the parent access points, a corresponding registration message identifying a corresponding specified priority based on a corresponding position in the ordered group, for use by the corresponding parent access point in selecting a corresponding distinct minimum interframe spacing for forwarding toward the mesh portal a wireless packet received from the apparatus via the corresponding mesh link.

* * * * *